Dec. 2, 1930.　　　　A. W. WALKER　　　　1,783,320

THERMOSTATIC CONTROL APPARATUS

Filed Oct. 27, 1928　　　2 Sheets-Sheet 1

INVENTOR
Arthur W. Walker
BY
ATTORNEYS

Dec. 2, 1930.  A. W. WALKER  1,783,320
THERMOSTATIC CONTROL APPARATUS
Filed Oct. 27, 1928  2 Sheets-Sheet 2
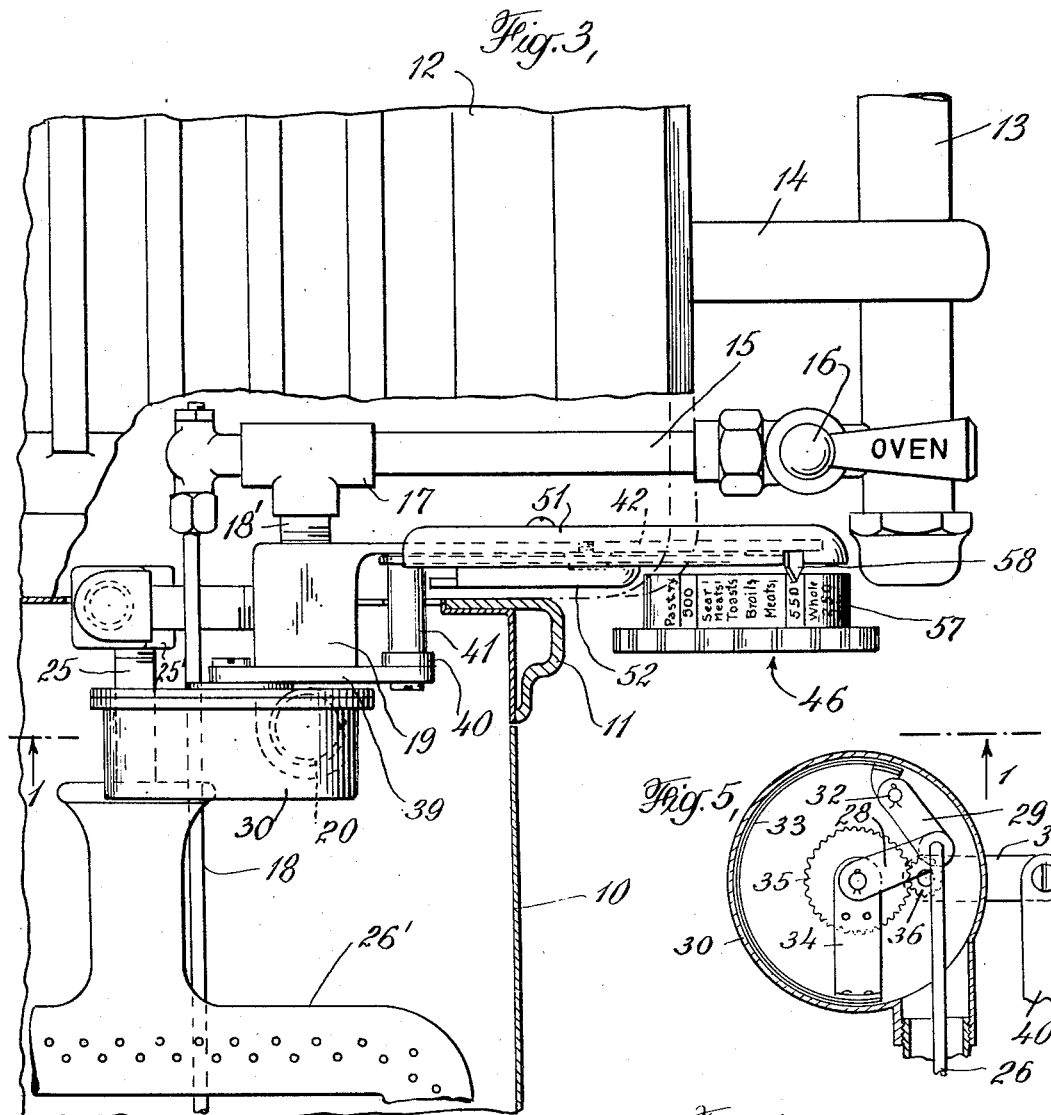
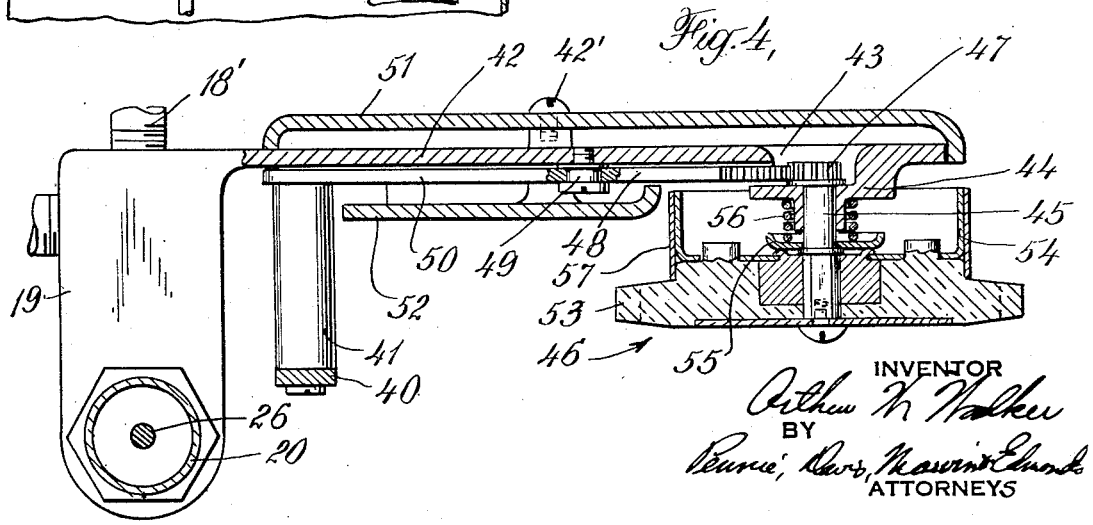

Patented Dec. 2, 1930

1,783,320

UNITED STATES PATENT OFFICE

ARTHUR W. WALKER, OF MALDEN, MASSACHUSETTS

THERMOSTATIC-CONTROL APPARATUS

Application filed October 27, 1928. Serial No. 315,443.

This invention relates to thermostatic control apparatus of the type which has particular reference to the governing of temperatures within an oven heated by gas, electricity, or the like.

Many forms of such thermostatic control devices are now in current use, the majority of which have preregistering means which may be manually set at the desired temperature whereby a thermostatic element placed in the oven mechanically controls the flow of fuel to maintain the oven at the desired temperature. Many of these devices are now associated with the oven in such a way that the dial for preregistering the desired temperature is mounted on the outside of the oven and usually directly above the open flames of the burners located under the plate or stove top. In this position the dial is exposed to the heat of the oven on which it is mounted and to the heat of the open flames of the stove burners, so that it is heated to such an extent as to be uncomfortable to manipulate and the user is also exposed to the direct heat emitted by the oven and the stove burners when the dial is examined and operated. Furthermore, this position of the dial is so close to the utensils on the top of the stove as to be not readily accessible, it is in the way, and is liable to damage by being struck or jarred when the utensils are arranged or placed on and removed from the stove. In addition to these objections, the graduated scale on the dial, when placed high on the side of the oven in the usual way, is difficult to read and the legends thereon frequently become illegible in the vapors arising from the cooking utensils on the stove, and these vapors often cause water, soot and grease to be deposited on the dial and its mechanism so that it is fouled and liable to rust, as well as being rendered illegible.

It is the principal object of this invention to provide a novel arrangement of and mechanism for manipulating a thermostatic control mechanism for governing the temperature in a gas oven or the like. In this arrangement the dial for setting the thermostatic element to operate at a predetermined temperature is placed remote therefrom and from the heat of the oven and stove burners, so that it is always cool, accessible, protected against damage and cooking vapors, and is so placed that the operator is not exposed to the direct heat of the oven or stove burners and can conveniently manipulate the dial concurrently with the pet-cock by which the gas is supplied to the oven through the thermostatic control device, thus eliminating two movements to separate points on the stove for performing the single operation of preparing the oven for use. The mechanism through which the dial operates the thermostatic control mechanism is direct-acting, immune to heat and changes in temperature, fool-proof and not liable to get out of order.

This object is obtained, in a preferred embodiment of the invention, by placing the thermostatic control dial adjacent the pet-cock by which gas is admitted to the oven through the thermostatic control mechanism, this pet-cock being usually mounted at the oven end of the manifold which supplies gas to all of the burners of the entire stove. The dial is mounted on a housing secured to the stove and contains a pinion connected to the dial and meshing with a pivoted sector having a portion projecting into the oven adjacent the thermostatic control mechanism mounted therein. This portion of the sector is connected by a linkage to the thermostatic element, so that through these connections the element may be directly set by setting the dial to the desired temperature. While this preferred embodiment is described and illustrated herein, it is to be understood that other embodiments having the same or similar characteristics lie within the scope of the invention, such as those employing various kinds of thermo-responsive elements, dial or lever manipulating devices having attached or remote scale, various kinds and arrangements of motion-transmitting systems, including gears, levers, linkages, or combinations of these, and the like.

For a better understanding of the invention, reference is made to the accompanying drawings, in which Figure 1 is an elevation of the preferred embodiment of this invention in partial vertical section taken along the line 1—1 of Fig. 3;

Fig. 3 is a plan view of the apparatus with a portion of the oven removed;

Fig. 4 is an enlarged cross-section of the operating mechanism of the apparatus as seen along the line 4—4 of Fig. 1; and Fig. 5 illustrates a modified arrangement of the thermo-responsive device.

Figure 1:
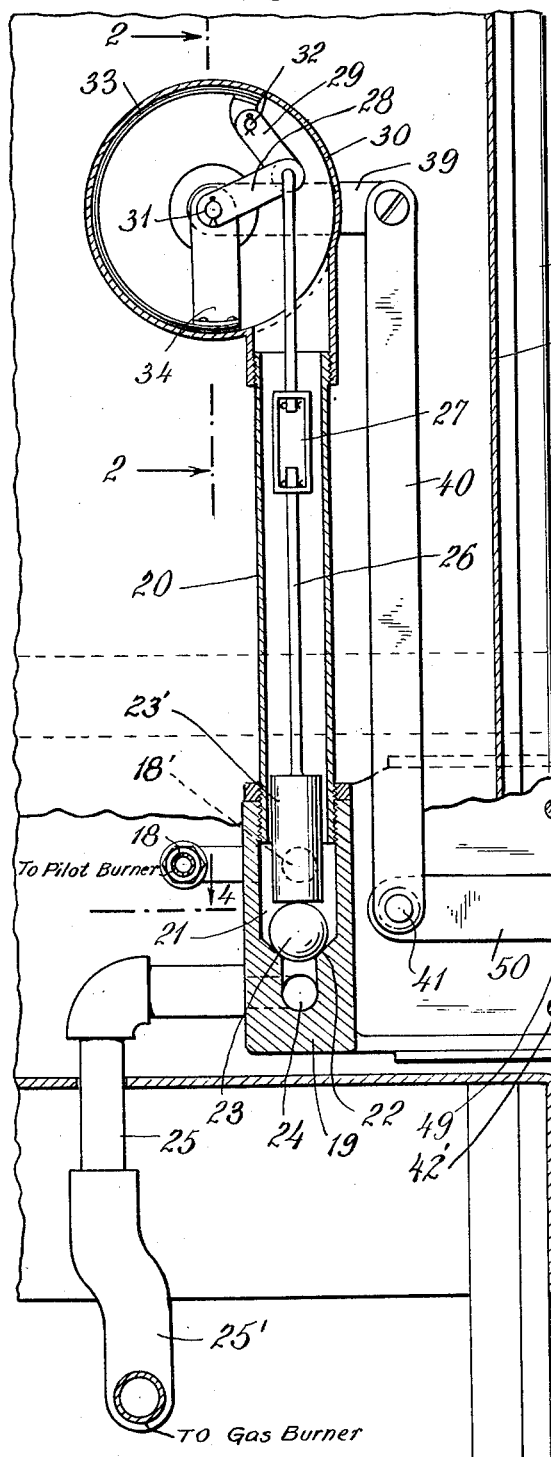

In these drawings, numeral 10 designates the oven and its frame 11 of the gas, electric, or the like, stove to which the thermostatic control apparatus of this invention is applied. The gas stove is provided with the usual stove plate 12 under which the open burners, not shown, are placed. For convenience, a stove using gas as fuel will be described, the burners of which are fed by a gas manifold 13 mounted on brackets 14, secured to the frame of the plate 12. Manifold 13 also provides gas to the oven by way of gas pipe 15, which is controlled by pet-cock 16 in the usual way. Gas pipe 15 discharge into a T fitting 17, one arm of which communicates with the pilot light supply tube 18 inserted within the oven 10, and leading to a point adjacent the burner 26', in the usual way. The other arm of the tee 17 is connected by a nipple 18' to the manifold 19 of the thermo-responsive device placed within oven 10. For purposes of illustration, this thermo-responsive device may be considered to be of the general type disclosed in Patent No. 1,625,080, issued April 19th, 1927, to E. L. Fonseca, and those portions of the patented device which are utilized in the apparatus of this invention will be briefly described.

Figure 2:
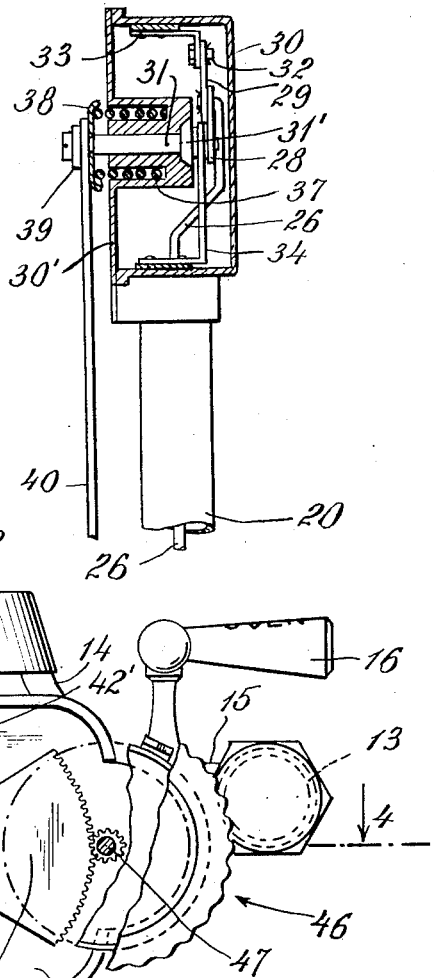
Fig. 2 is a vertical cross-section of the thermo-responsive mechanism of the apparatus, taken along the line 2—2 of Fig. 1.

The manifold 19 of the thermo-responsive device is fitted with a vertical tube 20 communicating with a chamber 21 formed within manifold 19 and supplied with gas through aforementioned nipple 18'. The lower portion of chamber 21 is provided with a conical valve seat 22, with which ball valve 23 cooperates, this ball valve being adapted to control the flow of gas from chamber 21 to chamber 24, which is connected to the oven burner 26' by means of pipe 25 through fitting 25'. Connected to ball valve 23 and extending axially through vertical tube 20 is a rod 26 provided with a turn-buckle 27 for adjusting the length of the rod, and a suitable weight 23' for insuring that the ball valve seats properly when released. The upper end of this rod 26 forms a pivot between links 28 and 29 located within circular housing 30, which is connected to the upper end of vertical tube 20. Link 28 is loosely mounted on shaft 31, journalled in the axial hub of cap 30' of housing 30 as shown in Figs. 1 and 2, while the other end of link 29 is loosely mounted on pin 32 secured to one end of the substantially semi-circular bi-metallic thermostatic strip 33 disposed around the interior surface of circular housing 30. The other end of strip 33 is secured to movable bracket 34 which is fixed to shaft 31. Inasmuch as the housing 30 is filled with gas, shaft 31 is provided with a conical valve 31' constrained gas-tightly in a corresponding conical seat in the hub of housing cover 30' by coil spring 37 bearing against disc 38 mounted on shaft 31.

It will be seen that the thermostatic strip 33 is movable bodily, and is so constructed and arranged that it will flex inwardly to reduce its radius when heated, the degree of this flexure being proportional to the heat to which it is subjected. This flexure is controllable mechanically by restricting the movemnt of the strip so that it will flex certain definite amounts for definite temperature changes. Therefore, by adjusting the strip by movement of bracket 34 to which one end of the strip 33 is attached, through shaft 31, the movement of the other end of the strip, and consequently of connected ball valve 23, may be predetermined, whereby the supply of gas to the burner 26' and the degree of heat thereof may be controlled. This briefly describes one form of thermo-responsive control device to which the improvement of this invention may be applied but it is to be understood that the apparatus of this invention may be applied to other forms of thermo-responsive devices, such as the elongating rod and expanding liquid types, with equal facility.

To the end of shaft 31, used for adjusting the thermostatic strip 33, is secured a crank 39, to the free end of which vertical link 40 is pivoted, this link preferably extending down below the open stove burner plate 12 to a point approximately adjacent the oven manifold 13. The lower end of this link 40 is provided with a laterally-projecting pin 41 extending through the wall of the oven to a point adjacent the outside wall thereof. As shown particularly in Figs. 3 and 4, the manifold 19 of the thermo-responsive device is provided with a plate-like flange 42 extending along the outside of the oven. The free end of this plate 42 is provided with an aperture 42 across which extends a flange 44 formed integrally with the plate 42. Flange 44 forms a journal for shaft 45 upon which control dial 46 is mounted. The inner end of shaft 45 is fitted with a pinion 47 projecting into aperture 43 of plate 44, and this pinion 47 meshes with toothed sector 48 pivoted upon stud 49 set in plate 42 and having an extending crank portion 50, which is connected to lateral pin 41 of link 40 as shown particularly in Figs. 1 and 4. Accordingly, by manipulating dial 46, thermostatic strip 33 may be adjusted in the manner described through the agency of crank 39, link 40, pin 41, sector 48, and pinion 47, which is connected to and driven by the dial 46.

These moving parts of the apparatus are enclosed by cover plates 51 and 52, the former extending over the whole of plate 42 and the latter extending from the edge of dial 46 to pin 41, and being shaped and secured to plate 42 by screws 42' so as to enclose sector 48 and its appurtenant parts. Thus, cover plates 51 and 52 form a complete housing for the apparatus just described, serving to protect the mechanism and the operator from having fingers caught therein, and also to prevent tampering and injury to the mechanism.

The dial 46 includes a knurled porcelain knob 53 mounted on a cup-shaped disc 54, which contains a friction plate 55 pressed by coil spring 56 against the bottom of cup-shaped disc 54 in the manner illustrated in Fig. 4. Accordingly, as the dial 46 is manipulated, the friction plate 55 will retain it in any position to which it is moved. The outer surface of cup-shaped disc 54 carries the graduated scale 57, which cooperates with the fixed index or pointer 58, suitably mounted on the free end of plate 42 or cover plate 51. The thermostatic strip 33 is calibrated to the various degrees of cooking temperatures and these temperatures are graduated upon scale 57, so that by manipulating dial 46 so that the desired oven temperature is registered opposite fixed pointer 58, thermostatic strip 33 is adjusted to control the gas supply to the oven through ball valve 23, whereby the temperature of the oven will be maintained at the desired degree preregistered upon the scale 57.

In the arrangement of the invention just described, the sector 48 and meshing pinion 47 serve as the motion reducing gearing, whereby a large and therefore more accurate movement of dial 46 causes only a relatively slight movement of the thermostatic strip 33, no further reducing gearing being necessary in housing 30. In the modification shown in Fig. 5, the desired reducing gearing is mounted in housing 30. In this arrangement a relatively large spur gear 35 is secured to bracket 34 by the rivets shown, or by other fastening means, and this gear 35 meshes with pinion 36 journalled in housing 30 and fixed to crank 39. Accordingly, as the remote control dial is manipulated, the accompanying motion of link 40 and crank 39 is transmitted to thermostatic strip 33 through gears 35 and 36 and bracket 34, this motion being reduced by gears 35 and 36. In this way, gears 35 and 36 may either replace or supplement rack 48 and pinion 47. In this connection, it is to be understood that any driving means, other than the dial, gearing and linkage arrangement shown, may be used with equal facility. For example, a chain, a cable, a rack and pinion, levers including reducing mechanisms, and the like drives may be used to connect the manipulating dial with the thermostatic strip, and the rotary dial with attached scale may be replaced by a lever with a fixed scale, or the like. Furthermore, it is not necessary that the scale be attached to or placed adjacent to the manipulating knob or the like, but the scale may be placed at a point remote therefrom where it will be visible from different points, this scale being connected so as to be driven by the manipulating knob or the like.

It will be seen that the present invention provides a novel thermostatic control apparatus for an oven and the like, using any kind of fuel whether gas, electricity or the like, whereby the temperature of the oven may be automatically controlled to maintain the desired degree by preregistering the desired temperature with a manipulating device located at a point remote from the thermo-responsive element situated within the oven or some other point subjected to the heat which is to be controlled. Accordingly, the manipulating means are not subject to high temperatures or changes in temperature and cannot get out of order for this reason, nor can they become too hot to be operated comfortably by hand. In the particular arrangement illustrated and described, in which the apparatus is applied to a gas stove, the knob of the thermostatic control apparatus is placed adjacent the pet-cock whereby gas is supplied to the oven whose temperature is to be controlled. Accordingly, both the thermostatic control apparatus and the pet-cock are manipulated at the same point and may be adjusted jointly, whereby the operation of preparing the oven is confined to one locality on the stove instead of to two or more localities as in existing arrangements. Furthermore, the operator is not subjected to the direct heat of the oven or the open burners of the gas stove, nor are the graduations on the dial liable to be either temporarily or permanently obscured by cooking vapors arising from the stove burners. While a preferred embodiment of the invention has been shown and described, it is to be understood that the invention is not limited to these disclosures, but is susceptible to various modifications and changes within its scope.

I claim:

1. In combination with an oven a thermostatic element and a fuel valve controlled by said element both located inside said oven, a calibrated adjusting device for said thermostatic element situated outside of said oven near the bottom thereof below said thermostat and remote therefrom and operatively connected to said thermostatic element by means of a segmental gear adapted to be operated by said adjusting device, a lever arm adapted to operate said thermostatic element and a link operatively connecting said lever and said gear.

2. In a gas oven a gas valve and a thermostatic element controlling said gas valve both located inside said oven, an external hand-operated valve in the gas line supplying gas to the oven, means for regulating said thermostat comprising a calibrated rotatable handle outside of said oven closely adjacent said hand operated valve and remote from said thermostatic element and connected thereto by means of a lever having a segmental gear on one end thereof adapted to be operated by said handle, a crank mounted on and operatively connected to said thermostatic element and a link operatively connecting said crank and said segmental gear.

In testimony whereof I affix my signature.

ARTHUR W. WALKER.